US010878240B2

(12) United States Patent
Laycock et al.

(10) Patent No.: US 10,878,240 B2
(45) Date of Patent: Dec. 29, 2020

(54) AUGMENTED REALITY USER INTERFACE ON MOBILE DEVICE FOR PRESENTATION OF INFORMATION RELATED TO INDUSTRIAL PROCESS, CONTROL AND AUTOMATION SYSTEM, OR OTHER SYSTEM

(71) Applicant: Honeywell International Inc., Morris Plains, NJ (US)

(72) Inventors: Graeme Laycock, Hunters Hill (AU); Peter Horsley, Wahroonga (AU); Rohan McAdam, Yetholme (AU)

(73) Assignee: Honeywell International Inc., Charlotte, NC (US)

( * ) Notice: Subject to any disclaimer, the term of this patent is extended or adjusted under 35 U.S.C. 154(b) by 126 days.

(21) Appl. No.: 15/898,502

(22) Filed: Feb. 17, 2018

(65) Prior Publication Data

US 2018/0365495 A1 Dec. 20, 2018

Related U.S. Application Data

(60) Provisional application No. 62/521,626, filed on Jun. 19, 2017.

(51) Int. Cl.
*G06K 9/00* (2006.01)
*G06K 9/46* (2006.01)
*G06K 9/20* (2006.01)

(52) U.S. Cl.
CPC ....... *G06K 9/00671* (2013.01); *G06K 9/2081* (2013.01); *G06K 9/46* (2013.01); *G06K 2209/19* (2013.01)

(58) Field of Classification Search
CPC ........................ G06T 19/006; G06T 19/00671
See application file for complete search history.

(56) References Cited

U.S. PATENT DOCUMENTS

| | | | | |
|---|---|---|---|---|
| 2013/0038633 A1* | 2/2013 | Maggiore | B01J 19/0033 | 345/633 |
| 2016/0071319 A1 | 3/2016 | Fallon et al. | | |
| 2016/0328883 A1* | 11/2016 | Parfenov | G06T 13/00 | |

* cited by examiner

*Primary Examiner* — Kenny A Cese

(57) ABSTRACT

A method includes identifying one or more first devices contained in at least one image captured by a mobile device. The method also includes obtaining data associated with at least one of: the one or more first devices and one or more second devices connected to or interacting with the one or more first devices. The method further includes presenting information overlaid over the at least one image by the mobile device to a user, where the presented information includes the data or information based on the data. The presented information varies based on perceived distance or proximity of the mobile device to the one or more first devices.

18 Claims, 14 Drawing Sheets connected to the I/O module. In case of DI, the correct values of external resistors have to be used to detect short circuit. In case of DO, the short circuit. Protection prevents the output to be driven. — 512

| | | | |
|---|---|---|---|
| ① | 10UV1012 | 0 | DO |
| ② | 10UV1014 | 12345 | AI |
| ③ | 10UV1015 | 85% | AO |
| ④ | 10UV1016 | 33 | DI |
| ⑤ | 10UV1017 | 106 | RTD |
| ⑥ | 10TX1013 | 0 | RTD |
| ⑦ | Unsigned | | 506 |
| ⑧ | 10UV1020 | 88 | PI |
| ⑨ | 10UV1021 | 0 | RTD |
| ⑩ | 10UV1022 | 115 | AI |
| ⑪ | 10UV1023 | 34.25% | AO |
| ⑫ | 10UV1024 | 123.45 kpa | DI |
| ⑬ | 10UV1025 | 28 | TC |
| ⑭ | 10UV1026 | 11 | PI |
| ⑮ | 10UV1027 | 70 | AI |
| ⑯ | 10UV1028 | 64% | AO |

— 436

436

AUGMENTED REALITY USER INTERFACE ON MOBILE DEVICE FOR PRESENTATION OF INFORMATION RELATED TO INDUSTRIAL PROCESS, CONTROL AND AUTOMATION SYSTEM, OR OTHER SYSTEM

CROSS-REFERENCE TO RELATED APPLICATION AND PRIORITY CLAIM

This application claims priority under 35 U.S.C. § 119(e) to U.S. Provisional Patent Application No. 62/521,626 filed on Jun. 19, 2017. This provisional application is hereby incorporated by reference in its entirety.

TECHNICAL FIELD

This disclosure generally relates to augmented reality visual displays. More specifically, this disclosure relates to an augmented reality user interface on a mobile device for the presentation of information related to an industrial process, control and automation system, or other system.

BACKGROUND

Industrial process control and automation systems are often used to automate large and complex industrial processes. Industrial processes are typically implemented using large numbers of devices, such as pumps, valves, compressors, or other industrial equipment used to implement various aspects of the industrial processes. Control and automation systems also routinely include large numbers of devices, such as sensors, actuators, and programmable logic controllers (PLCs), used to monitor and control the industrial equipment.

Numerous devices in these types of systems can generate operational, diagnostic, or other data and transmit the data to other components for analysis, storage, or other uses. For example, at least some of this data could be used to identify issues in control and automation systems or in the underlying industrial processes. Maintenance personnel or other personnel could then be dispatched to repair or replace equipment or take other suitable corrective actions to resolve the issues. Similar operations could occur in other systems that include large numbers of devices, such as building management systems.

SUMMARY

This disclosure provides an augmented reality user interface on a mobile device for the presentation of information related to an industrial process, control and automation system, or other system.

In a first embodiment, a method includes identifying one or more first devices contained in at least one image captured by a mobile device. The method also includes obtaining data associated with at least one of: the one or more first devices and one or more second devices connected to or interacting with the one or more first devices. The method further includes presenting information overlaid over the at least one image by the mobile device to a user, where the presented information includes the data or information based on the data. The presented information varies based on perceived distance or proximity of the mobile device to the one or more first devices.

In a second embodiment, a mobile device includes a display, a camera configured to capture at least one image of one or more first devices, and at least one processor. The at least one processor is configured to identify the one or more first devices contained in the at least one image. The at least one processor is also configured to obtain data associated with at least one of: the one or more first devices and one or more second devices connected to or interacting with the one or more first devices. The at least one processor is further configured to present information overlaid over the at least one image on the display to a user, where the presented information includes the data or information based on the data. The presented information varies based on perceived distance or proximity of the mobile device to the one or more first devices.

In a third embodiment, a non-transitory computer readable medium contains instructions that when executed cause at least one processing device to identify one or more first devices contained in at least one image captured by a mobile device. The medium also contains instructions that when executed cause the at least one processing device to obtain data associated with at least one of: the one or more first devices and one or more second devices connected to or interacting with the one or more first devices. The medium further contains instructions that when executed cause the at least one processing device to present information overlaid over the at least one image by the mobile device to a user, where the presented information includes the data or information based on the data. The presented information varies based on perceived distance or proximity of the mobile device to the one or more first devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
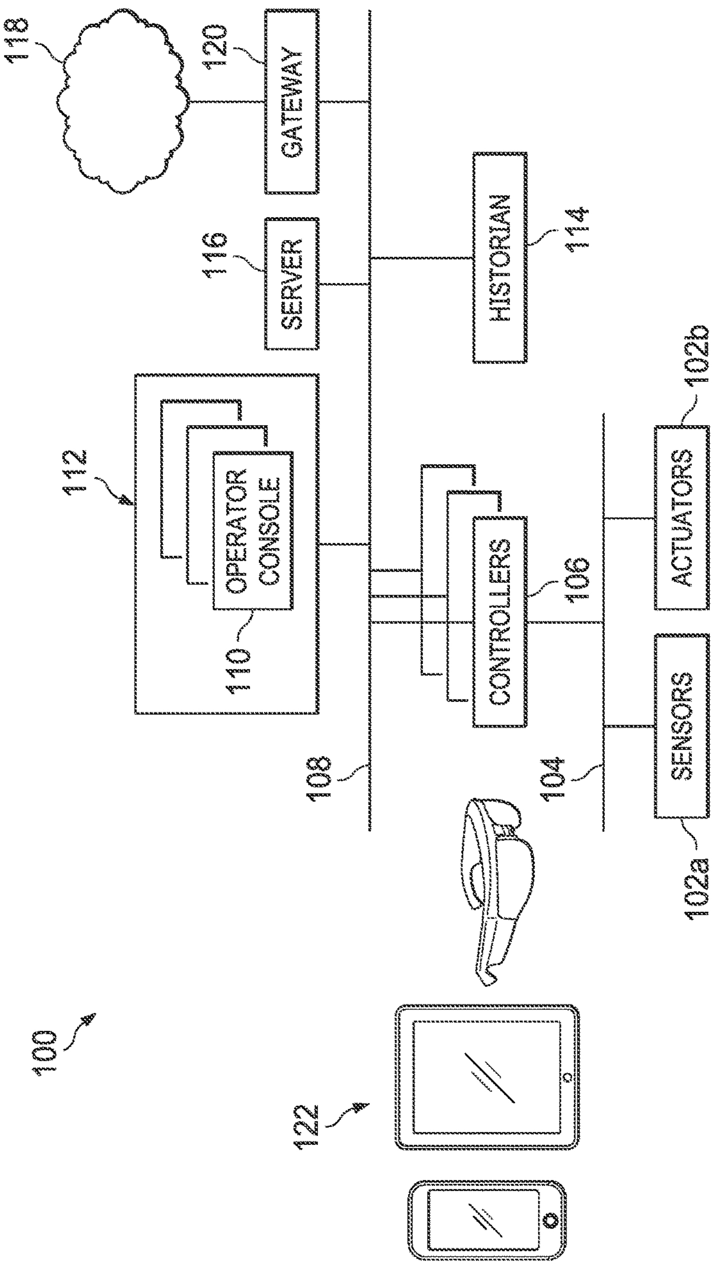
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102*a* and one or more actuators 102*b*. The sensors 102*a* and actuators 102*b* represent components in a process system that may perform any of a wide variety of functions. For example, the sensors 102*a* could measure a wide variety of characteristics in the process system, such as pressure, temperature, or flow rate. Also, the actuators 102*b* could alter a wide variety of characteristics in the process system. Each of the sensors 102*a* includes any suitable structure for measuring one or more characteristics in a process system. Each of the actuators 102*b* includes any suitable structure for operating on or affecting one or more conditions in a process system.

At least one network 104 is coupled to the sensors 102*a* and actuators 102*b*. The network 104 facilitates interaction with the sensors 102*a* and actuators 102*b*. For example, the network 104 could transport measurement data from the sensors 102*a* and provide control signals to the actuators 102*b*. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102*a* to control the operation of one or more actuators 102*b*. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent programmable logic controllers (PLCs), proportional-integral-derivative (PID) controllers, or multivariable controllers such as controllers implementing model predictive control (MPC) or other advanced predictive control (APC). As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120. It is also possible to implement common or different functions using the server 116 and the computing cloud 118 or remote server.

As noted above, industrial processes are typically implemented using large numbers of devices, such as pumps, valves, compressors, or other industrial equipment. Similarly, industrial process control and automation systems are typically implemented using large numbers of devices, such as the sensors 102*a*, actuators 102*b*, controllers 106, and other components in FIG. 1. Numerous devices can generate operational, diagnostic, or other data and transmit the data to other components for analysis, storage, or other uses. In some embodiments, operational data may generally relate to the industrial process(es) being controlled or monitored (such as temperatures, pressures, flow rates, or other values), while diagnostic data may generally relate to information about the equipment itself. However, other or additional forms or types of data could be used in these or other systems.

Getting the appropriate data to the appropriate personnel in a large or complex system can be a challenging task. For example, maintenance personnel or other personnel may need access to operational, diagnostic, or other data in order to properly diagnose and resolve issues within a control and automation system or the underlying industrial processes.

This can be difficult when there are numerous components, possibly in close proximity to one another, in the field.

This disclosure provides techniques that utilize mobile devices 122 to display detailed information for devices in industrial processes, process control and automation systems, or other systems. This is accomplished by augmenting a camera view of one or more devices with one or more augmented reality visual overlays containing detailed information about those devices or about other devices connected to or interacting with those devices. For example, a user could aim a mobile device 122 at a controller 106 and view an augmented reality visual overlay containing information about the controller 106 or about devices coupled to the controller 106 (such as sensors 102*a*, actuators 102*b*, or other controllers 106). The augmented reality visual overlays could include text, symbols, icons, animations, trends, or any other or additional information.

An augmented reality visual overlay can be overlaid over an image or a stream of images of one or more devices, such as by using the image processing features of the mobile device 122. The visual overlay can be positioned over the image(s) based on special-purpose markers or natural features of the devices. For example, the mobile device 122 could use one or more geometries, colors, or textures of one or more controllers 106 or other devices to identify positioning information for one or more augmented reality objects. The augmented reality objects can then be inserted into the view from the camera of the mobile device 122 to give the appearance that the augmented reality objects are located on or adjacent to the device(s) being viewed through the camera. The augmented reality objects can be used to provide various levels of information to a user, such as information that varies based on how close the user is to the one or more devices being viewed through the camera. The user could also select various devices or augmented reality objects to obtain more detailed information about particular aspects of the devices or augmented reality objects.

The information used to generate the one or more augmented reality visual overlays could be obtained in any suitable manner. For example, the mobile devices 122 could obtain data directly from the devices themselves, such as through wireless communications via BLUETOOTH, WiFi, or infrared connections. The mobile devices 122 could also or alternatively obtain data indirectly from the devices, such as through a historian 114, a local server 116, or a cloud-based service provided using the computing cloud 118.

Any suitable mobile device 122 having a camera and a display could be used to provide augmented reality visual overlays. In this example, the mobile devices 122 include a smart phone, smart glasses, and a tablet device. However, any other or additional types of mobile devices could be used here, such as laptop computers. Also, the functionality for providing the augmented reality visual overlays could be implemented in any suitable manner. For instance, a software "app" or other application could be loaded onto the mobile device 122 and executed by one or more processors of the mobile device 122.

Additional details regarding augmented reality visual overlays for use in providing information related to industrial processes, control and automation systems, or other systems are provided below. Note that these details relate to specific implementations of devices that provide or support the visual overlays, specific implementations of the visual overlays, and specific uses of the visual overlays, although other implementations of the devices and visual overlays could be used and the visual overlays could be used for any suitable purposes.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, mobile devices, and other components. Also, the makeup and arrangement of the system 100 in FIG. 1 are for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, while FIG. 1 illustrates one example operational environment where augmented reality visual overlays could be used to provide information about devices, this functionality can be used in any other suitable system (and that system need not relate to industrial process control and automation).

Figure 2:
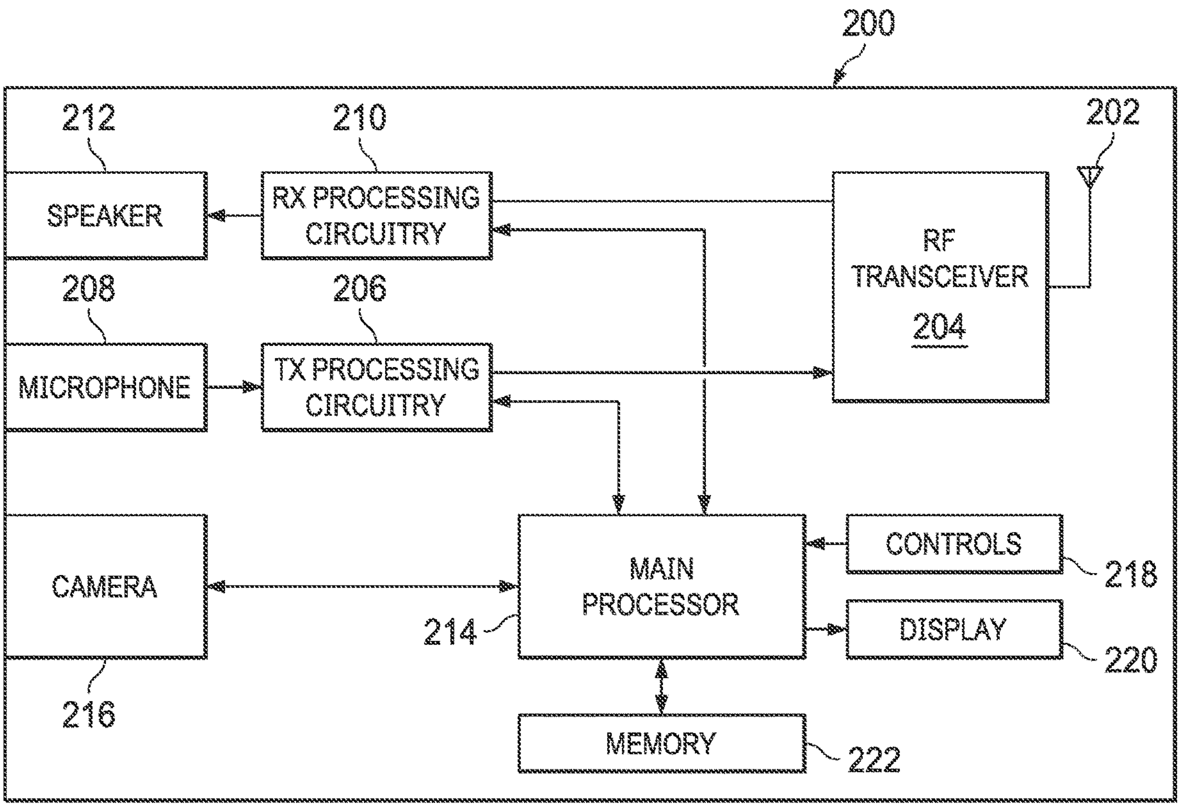
FIGS. 2 and 3 illustrate example devices supporting augmented reality user interfaces for presenting information related to an industrial process, control and automation system, or other system according to this disclosure.
Figure 3:
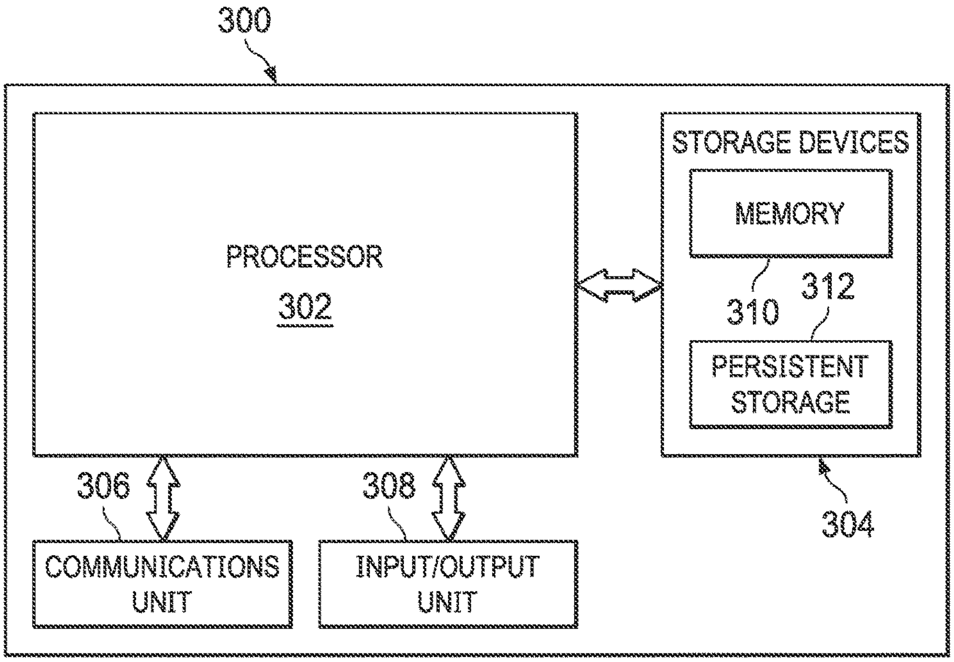

FIGS. 2 and 3 illustrate example devices supporting augmented reality user interfaces for presenting information related to an industrial process, control and automation system, or other system according to this disclosure. In particular, FIG. 2 illustrates an example mobile device 200, and FIG. 3 illustrates an example server or other computing device 300. The mobile device 200 could be used to present augmented reality visual overlays to users, and the computing device 300 could be used to support the generation or presentation of augmented reality visual overlays to users (such as by providing operational, diagnostic, or other data to the mobile device 200). For ease of explanation, the mobile device 200 and the computing device 300 are described as being used in the system 100 of FIG. 1, although the mobile device 200 and the computing device 300 could be used in any other suitable system (whether or not related to industrial process control and automation).

As shown in FIG. 2, the mobile device 200 includes an antenna 202, a radio frequency (RF) transceiver 204, transmit (TX) processing circuitry 206, a microphone 208, receive (RX) processing circuitry 210, and a speaker 212. The mobile device 200 also includes a main processor 214, a camera 216, one or more physical controls 218, a display 220, and a memory 222.

The RF transceiver 204 receives, from the antenna 202, an incoming RF signal, such as a cellular, WiFi, or BLUETOOTH signal. The RF transceiver 204 down-converts the incoming RF signal to generate an intermediate frequency (IF) or baseband signal. The IF or baseband signal is sent to the RX processing circuitry 210, which generates a processed baseband signal by filtering, decoding, and/or digitizing the baseband or IF signal. The RX processing circuitry 210 can transmit the processed baseband signal to the speaker 212 or to the main processor 214 for further processing.

The TX processing circuitry 206 receives analog or digital data from the microphone 208 or other outgoing baseband data from the main processor 214. The TX processing circuitry 206 encodes, multiplexes, and/or digitizes the outgoing baseband data to generate a processed baseband or IF signal. The RF transceiver 204 receives the outgoing processed baseband or IF signal from the TX processing circuitry 206 and up-converts the baseband or IF signal to an RF signal that is transmitted via the antenna 202.

The main processor 214 can include one or more processors or other processing devices and execute an operating system, applications, or other logic stored in the memory 222 in order to control the overall operation of the mobile device 200. For example, the main processor 214 could control the transmission and reception of signals by the RF transceiver 204, the RX processing circuitry 210, and the TX processing circuitry 206 in accordance with well-known principles. In some embodiments, the main processor 214 includes at least one microprocessor or microcontroller, although other types of processing devices could also be used.

The main processor 214 is also capable of executing other processes and applications resident in the memory 222. The main processor 214 can move data into or out of the memory 222 as required by an executing application. The main processor 214 is also coupled to the camera 216, which provides data to the main processor 214 for the generation of digital images or video streams. The images or video streams can be presented to a user via the display 220.

The main processor 214 is also coupled to the physical controls 218 and the display 220. A user of the mobile device 200 can use the physical controls 218 to invoke certain functions, such as powering on or powering off the device 200 or controlling a volume of the device 200. The display 220 may be a liquid crystal display (LCD), light emitting diode (LED) display, or other display capable of rendering text and graphics. If the display 220 denotes a touchscreen capable of receiving input, fewer or no physical controls 218 may be needed.

The memory 222 is coupled to the main processor 214. Part of the memory 222 could include a random access memory (RAM), and another part of the memory 222 could include a Flash memory or other read-only memory (ROM). Each memory 222 includes any suitable structure for storing and facilitating retrieval of information.

As shown in FIG. 3, the computing device 300 includes at least one processor 302, at least one storage device 304, at least one communications unit 306, and at least one input/output (I/O) unit 308. Each processor 302 can execute instructions, such as those that may be loaded into a memory 310. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a RAM or any other suitable volatile or non-volatile storage device(s). The persistent storage 312 may contain one or more components or devices supporting longer-term storage of data, such as a ROM, hard drive, Flash memory, or optical disc.

The communications unit 306 supports communications with other systems or devices. For example, the communications unit 306 could include at least one network interface card or wireless transceiver facilitating communications over at least one wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

As described above, the mobile device 200 is used to present one or more augmented reality visual overlays to a user. For example, the main processor 214 or other component of the mobile device 200 could receive one or more images from the camera 216 and identify at least one desired location for one or more augmented reality objects to be overlaid onto the images. The display 220 could then present the one or more images to the user along with the one or more augmented reality objects overlaid on the images. The one or more augmented reality objects can be based on or present operational, diagnostic, or other data for one or more devices contained within the images or related to the device(s) contained within the images. The computing device 300 could optionally be used to provide the data to the mobile device 200 or perform other functions related to the augmented reality visual overlays presented by the mobile device 200. However, the mobile device 200 could perform all of the augmented reality operations itself without the use of any external computing devices.

Although FIGS. 2 and 3 illustrate examples of devices supporting augmented reality user interfaces for presenting information related to an industrial process, control and automation system, or other system, various changes may be made to FIGS. 2 and 3. For example, various components in each figure could be combined, further subdivided, or omitted and additional components could be added according to particular needs. As a particular example, each processor 214 or 302 could be divided into multiple processors, such as one or more central processing units (CPUs) and one or more graphics processing units (GPUs). Also, mobile and computing devices come in a wide variety of configurations, and FIGS. 2 and 3 do not limit this disclosure to any particular mobile device or computing device.

FIGS. 4A through 5E illustrate example augmented reality user interfaces according to this disclosure. For ease of explanation, the augmented reality user interfaces are described as being presented on a display 220 of a mobile device 200 when used in the system 100 of FIG. 1. Thus, the augmented reality user interfaces here are used to provide information about devices in one or more industrial processes and/or one or more industrial process control and automation systems. However, any other suitable user interfaces could be generated and used in any suitable system (whether or not related to industrial process control and automation).

As shown in FIGS. 4A through 4D, different visual overlays can be presented to a user based (at least in part) on the user's distance from one or more devices and on the user's invocations of one or more commands. For example, in FIG. 4A, a visual overlay 402 could be presented when a user is farther away from one or more devices. This view could be referred to as a "distant" view, although this does not require a specific minimum distance from the devices. In this example, the visual overlay 402 includes or is presented over at least one image 404 (possibly an image stream). One or more devices 406 are included in or captured by the image(s) 404, and each device 406 could be formed using one or more modules 408. The visual overlay 402 here includes one or more augmented reality objects 410 displayed in association with the devices 406. In this particular example, each augmented reality object 410 includes the name and status of a device 406 and an icon or other graphic symbol that identifies the status or other information about the device 406. For instance, an icon formed using a green circle and a checkmark could indicate that the associated device 406 is currently operating without any alarms, warnings, or other adverse notifications. In contrast, an icon formed using a red circle and an "X" mark could indicate that the associated device 406 is currently operating under an alarm, warning, or other adverse notification.

Figure 4A:
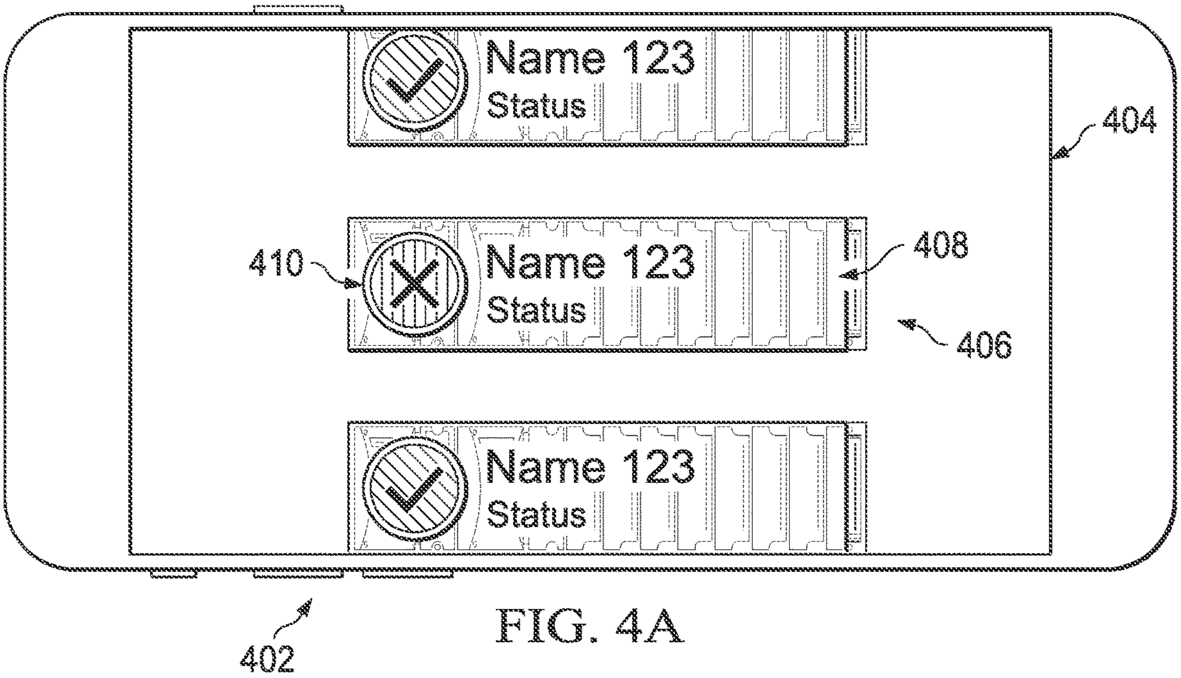
FIGS. 4A through 5E illustrate example augmented reality user interfaces according to this disclosure.
Figure 4B:
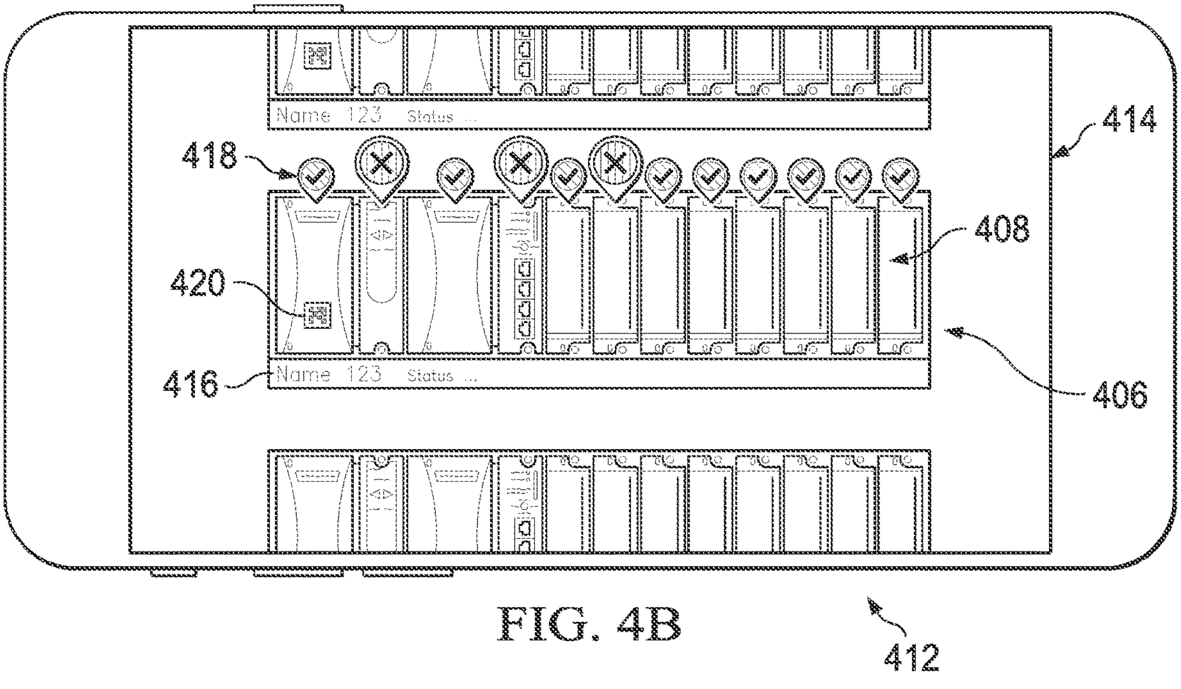

In FIG. 4B, a visual overlay 412 could be presented when a user is closer to the devices. This view could be referred to as a "medium" view, although this does not require a specific minimum or maximum distance from the devices. In this example, the visual overlay 412 includes or is presented over at least one image 414 (possibly an image stream). At least one of the devices 406 is included in or captured by the image(s) 414, along with its associated module(s) 408. The visual overlay 412 here includes one or more augmented reality objects 416 each in the form of text identifying the name and status of an associated device 406. The visual overlay 412 also includes augmented reality objects 418 that present statuses for individual modules 408 of at least one device 406. As in FIG. 4A, each augmented reality object 418 here can take different forms, such as depending on whether an associated module 408 is currently operating under any alarms, warnings, or other adverse notifications. In this particular example, the statuses are presented for the middle device 406 within the image 414, although repositioning of the mobile device 200 could allow the statuses to be presented for more than one device 406 or for different devices 406. In some embodiments, at least some of the devices 406 could have associated graphical identifiers 420, such as barcodes or QR codes.

Figure 4C:
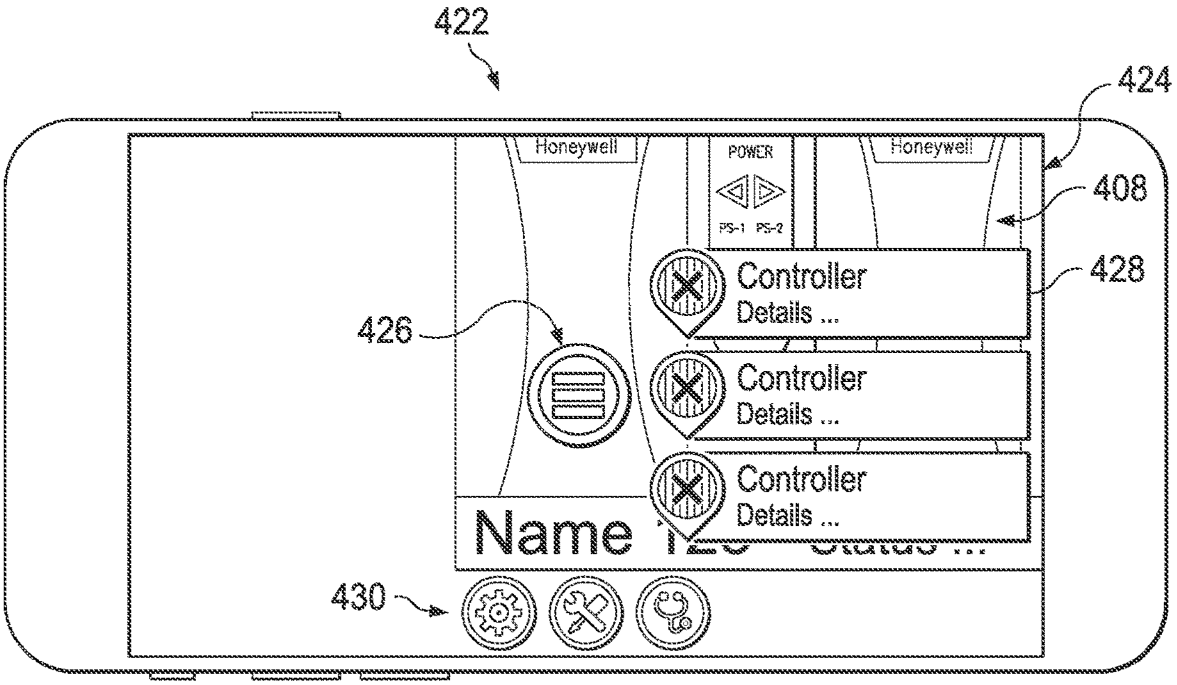

In FIG. 4C, a visual overlay 422 could be presented when a user is very close to one or more devices 406. This view could be referred to as a "near" view, although this does not require a specific minimum or maximum distance from the industrial equipment. In this example, the visual overlay 422 includes or is presented over at least one image 424 (possibly an image stream), and the contents of the visual overlay 422 could be based on what the user is "dwelling" upon in the displayed image(s) 424. For example, a graphical marker 426 (a circle in this example) could be used to identify different physical or augmented reality objects within the displayed image(s) 424. In the visual overlay 422 shown in FIG. 4C, the user is dwelling on the graphical identifier 420 that uniquely identifies a device 406, which causes the visual overlay 422 to present augmented reality objects 428 identifying any modules 408 in the specific device 406 that are currently experiencing an issue. A user could select one of the augmented reality objects 428 to view additional details regarding the specific module 408 and its issue(s). The visual overlay 422 also presents a toolkit 430, which includes various functions that could be selected by the user. These functions could relate to specific settings or parameters of the device 406 or any of its modules 408, and the user could select one or more of the functions to reconfigure or otherwise alter the device 406 or its modules 408.

Figure 4D:
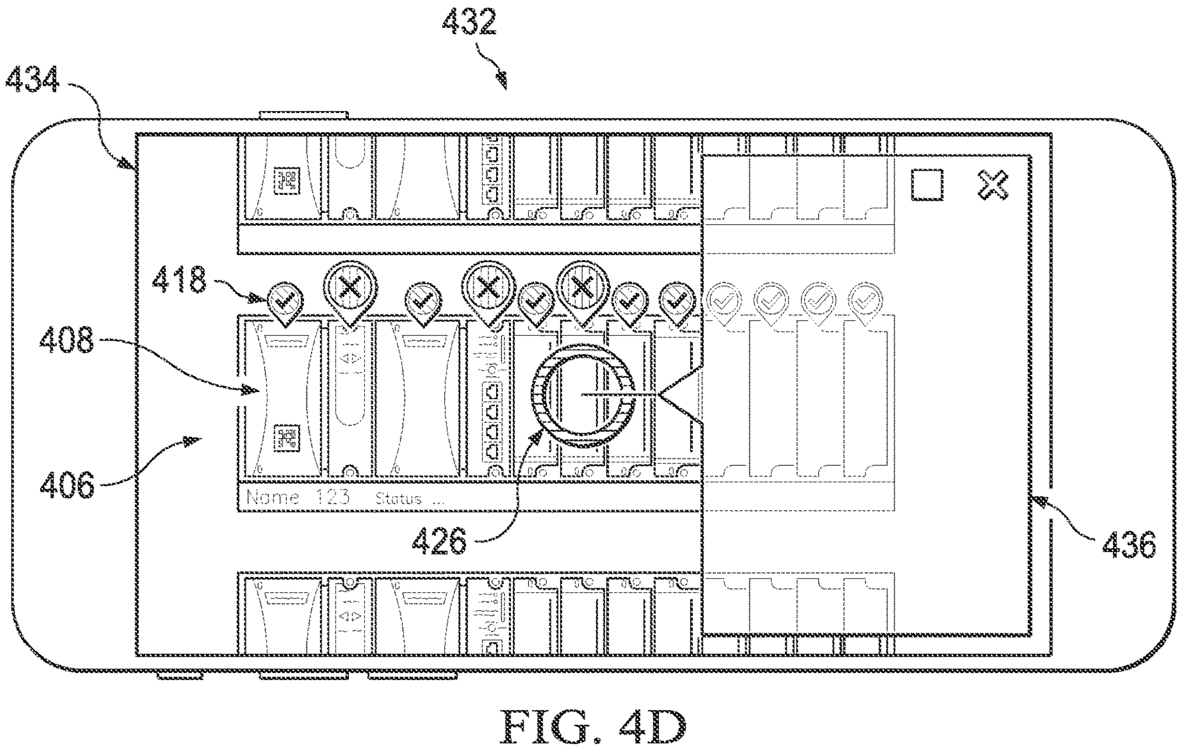

In FIG. 4D, a visual overlay 432 is similar to the visual overlay 412. In this example, the visual overlay 432 includes or is presented over at least one image 434 (possibly an image stream). At least one of the devices 406 and its associated module(s) 408 are included in or captured by the image(s) 434. Again, the contents of the visual overlay 432 could be based on what the user is "dwelling" upon in the displayed image(s) 434. For example, the user could dwell on a specific module 408 in a device 406 using the graphical marker 426, causing the visual overlay 432 to present an augmented reality object 436 in the form of a window in which data about the specific module 408 can be viewed and possibly changed.

Note that while the graphical marker 426 is not shown in the visual overlays 402 and 412, the graphical marker 426 could be used in those visual overlays or any other visual overlays at any suitable distance(s) from one or more devices 406. Also note that while dwelling is one example mechanism for invoking certain augmented reality functions, other mechanisms could also be used. For example, one or more augmented reality objects 428 associated with a device 406 could be presented when the device's augmented reality object 410 is selected in the visual overlay 402 of FIG. 4A, such as when a user touches the augmented reality object 410 on the display 220. Similarly, the augmented reality object 436 could be presented when a module's augmented reality object 418 is selected in the visual overlay 412 of FIG. 4B or in the visual overlay 432 of FIG. 4D, such as when a user touches the augmented reality object 418 on the display 220. In general, various mechanisms and flow paths could be used to select devices or device modules and view information about those devices or device modules.

The visual overlays shown here allow a progressive disclosure of more and more detailed information to a user. For example, when the user positions the mobile device's camera some distance away from a device, a summary view may be given with a "rolled up" (summarized or aggregated) status of the device. Only a few indications (such as just an identification and a tick/cross indicating overall health) may be shown at this distance. An example of this is shown in the visual overlay 402. As the user moves the mobile device 122 closer to the device, progressively more and more detailed information can be given, such as visual overlays that incorporate labels and current values for process variables. Examples of these are shown in the visual overlays 412, 422, and 432. In the examples shown in FIGS. 4A through 4D, this progressive disclosure is performed for modular devices 406 that include a rack or row containing modules 408, where modules 408 may contain channels or ports. The progressive disclosure shows a single identification and status for the whole rack or row, then the overall status for each module, and then the individual channel or port status on the specific modules that are in the camera view. Thus, the information presented to the user can vary based on distance or proximity to the devices.

The graphical marker 426 here denotes a "dwell selection" navigation feature that allows a user to locate an augmented reality pointer (which is an overlay object) on a specific component, module, or device feature or on an augmented reality object associated with the component, module, or device for a short period of time. If the graphical marker 426 remains relatively stationary during this short period of time, the user can be automatically presented with an additional window or other augmented reality object(s) showing more detailed information about the particular component, module, device, or augmented reality object selected by the user. The additional detail window or other augmented reality object(s) may persist until the next "dwell" navigation is performed by the user, or the additional detail window or other augmented reality object(s) may be closed through separate interactions. Among other things, this removes the need for a user to have to make touch interactions on the mobile device to select items that he or she wants more information about or to "drill down" into more details for specific items of interest. However, touch interactions can still be supported here.

FIGS. 5A through 5E illustrate examples of the types of information that could be presented in the additional detail window (the augmented reality object 436) shown in the visual overlay 432 in FIG. 4D. The additional detail window can be used to provide various information and various levels of information to a user. In some embodiments, the additional detail window could denote a hypertext markup language (HTML) window or other window that allows a user to navigate within the window and select other or additional information for display. Different content could be viewed in the window via appropriate navigation tools (such as hyperlinks) in the window.

In FIGS. 5A through 5E, the augmented reality object 436 includes two controls 502 and 504 located at the top of the window. The control 502 allows a user to close the augmented reality object 436. The control 504 allows the user to export the information contained in the augmented reality object 436 to documentation that is viewable in a full screen window. The remaining contents of the augmented reality object 436 vary based on what information the user has requested to view.

Figure 5A:
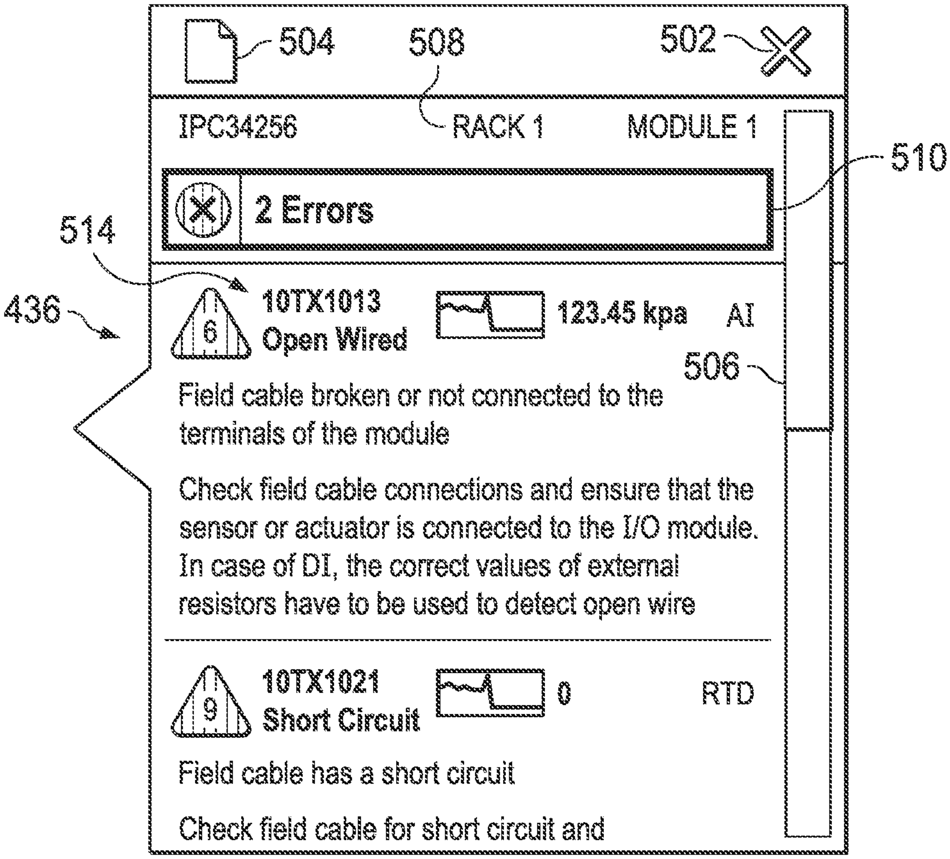
Figure 5B:
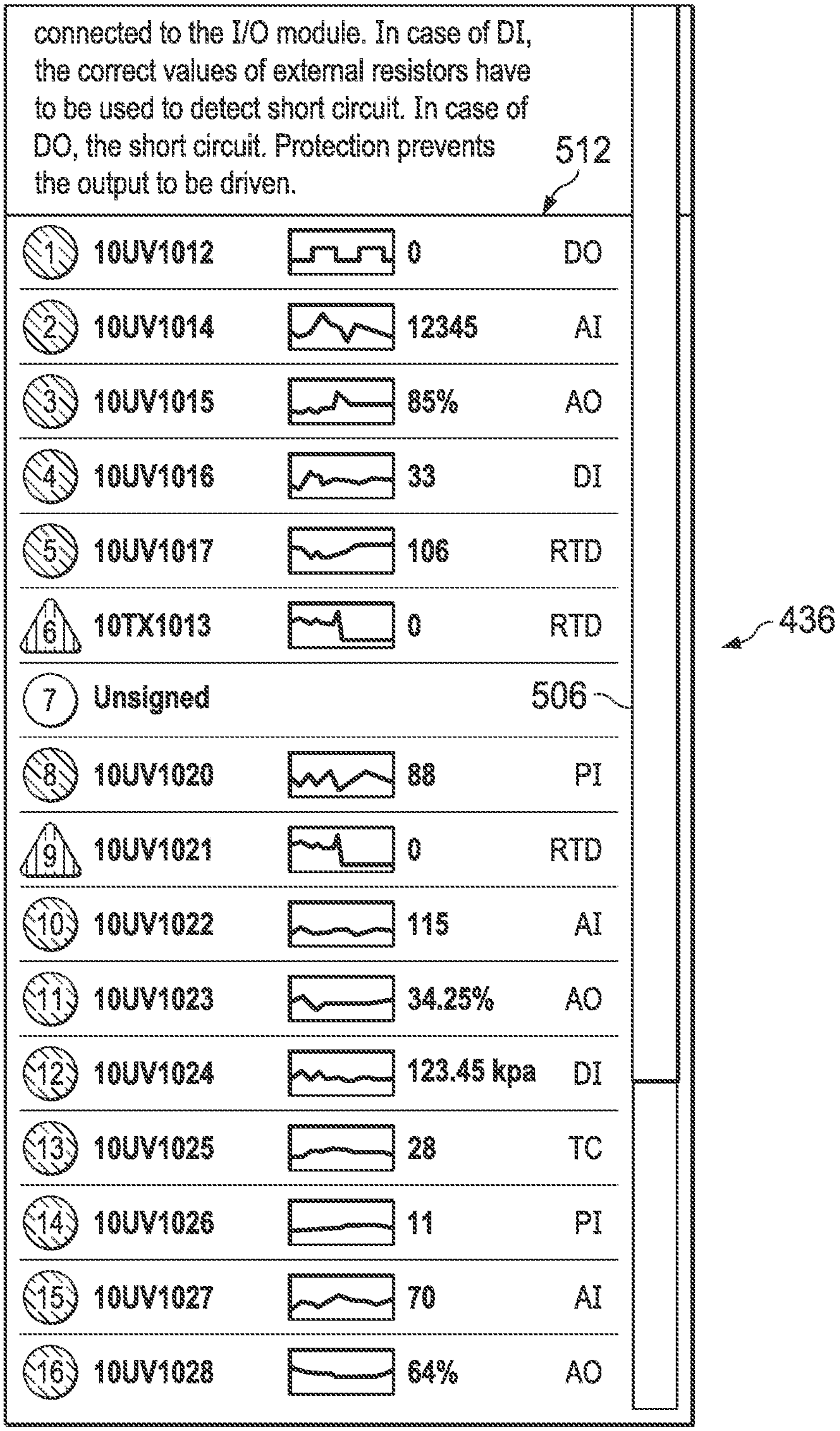

In FIGS. 5A and 5B, the user has selected a specific module 408, such as by dwelling on an image of the module 408 using the graphical marker 426 or by touching the augmented reality object 418 associated with that module 408. However the module 408 is selected, the augmented reality object 436 is displayed containing information for that selected module 408. Note that FIGS. 5A and 5B form part of the same display, where a user can use a scrollbar 506 or other mechanism to scroll through the information contained in the augmented reality object 436. Here, the augmented reality object 436 displays information 508 identifying the selected module 408, a status 510 of the selected module 408, and a list 512 of I/O channels associated with the selected module 408. The augmented reality object 436 could also display information 514 describing any errors associated with the selected module 408.

In this particular example, the information 508 includes a device name, rack number, and module number associated with the selected module 408, although any other or additional identifying information could be used. Also, in this particular example, the status 510 includes one of multiple icons (depending on whether the selected module 408 has any errors) and a number of errors associated with the selected module 408 (if any). However, any other suitable summary of the selected module's status could be used. Further, in this particular example, the list 512 of I/O channels includes a channel number, one of multiple icons (depending on whether the channel has any errors), a channel name, a spark line graphically showing a value associated with the channel over time, a current value, and a type of channel. The type of channel could have various values, such as analog input (AI), analog output (AO), digital input (DI), digital output (DO), pulse accumulator input (PI), resistance temperature detector (RTD), or thermocouple (TC). Of course, other or additional information associated with each channel of the selected module 408 could be displayed. In addition, in this particular example, for each error (if any) with the selected module 408, the information 514 identifies the channel name and number, an icon indicating the channel has an error, the type of error, a spark line, a current channel value, a channel type, and a description of the error and how the error might be resolved. Again, other or additional information associated with each error with the selected module 408 could be displayed.

Figure 5C:
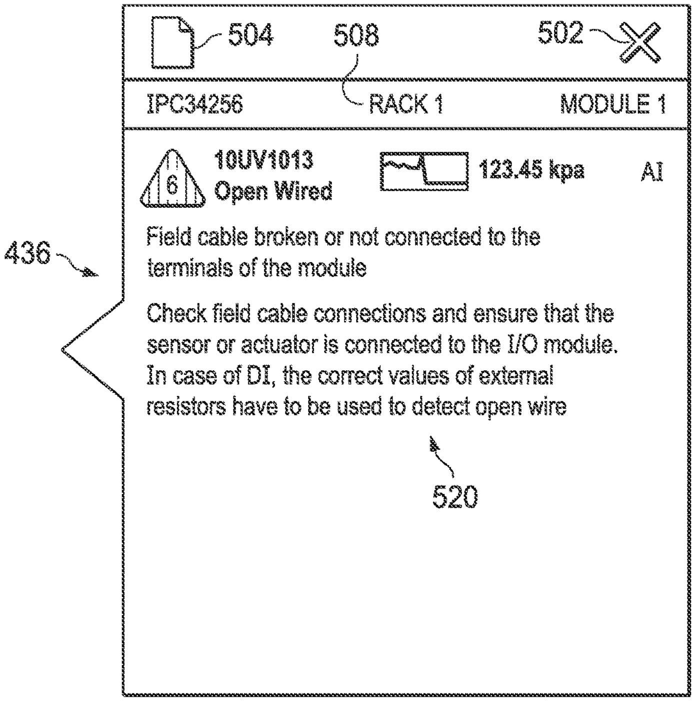

In FIG. 5C, the user has selected a specific channel of a specific module 408, such as by selecting one of the channels in the list 512 or by selecting one of the errors identified in the displayed information 514. However the channel is selected, the augmented reality object 436 is displayed containing information for that selected channel. Here, the augmented reality object 436 includes the information 508 identifying the module 408 associated with the selected channel and information 520 associated with the selected channel. In this particular example, the information 520 is the same as or similar to at least part of the information 514 contained in FIGS. 5A and 5B since both relate to the same error, although this need not be the case. The information 520 could, for example, contain more detailed descriptions of an error and how to resolve the error. Also, if the selected channel is not currently under an error, the displayed information 520 would be different.

Figure 5D:
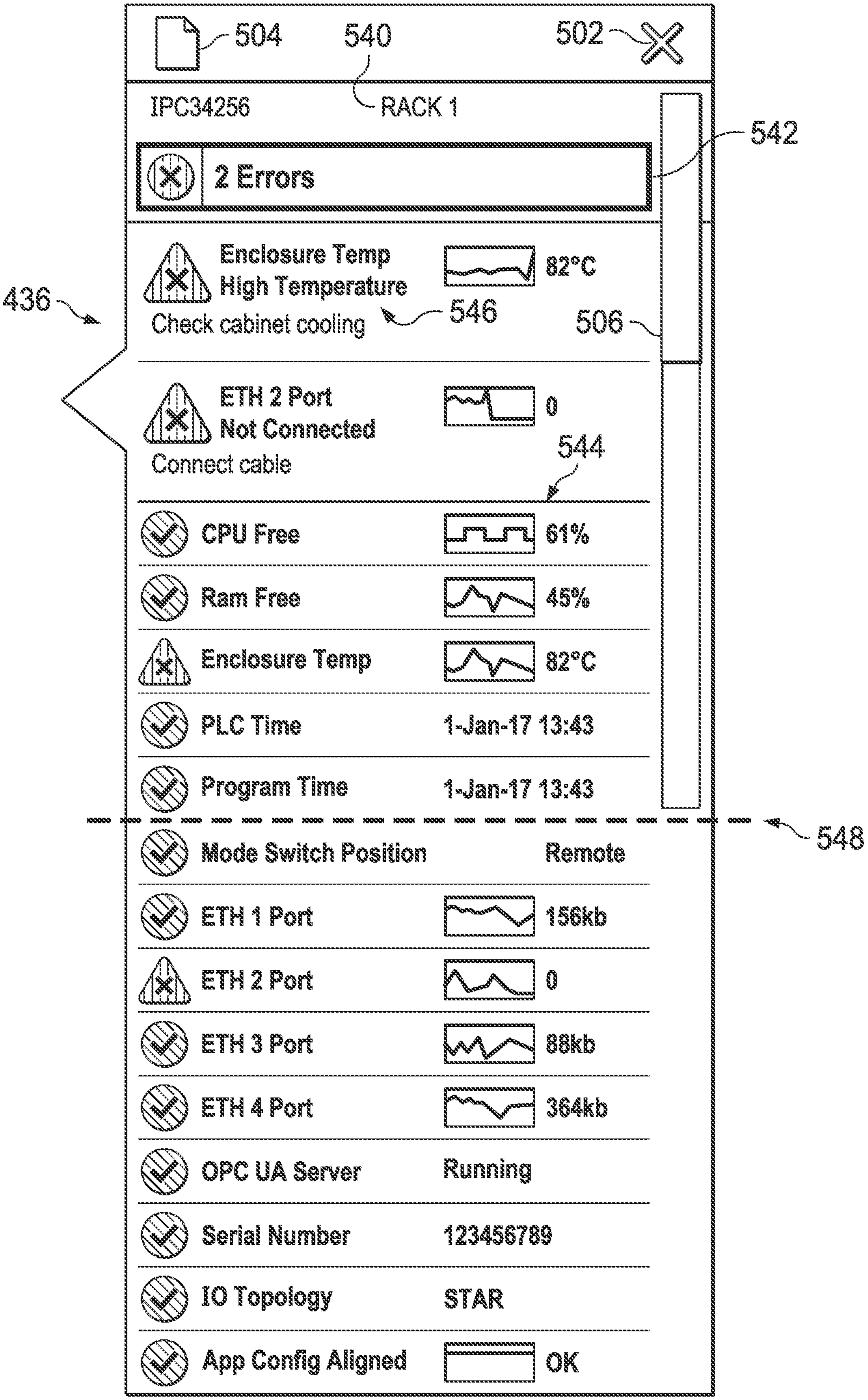

In FIG. 5D, the user has selected a specific device 406 (like a PLC), such as by dwelling on the graphical identifier 420 of the device 406 using the graphical marker 426. The device 406 selected here is the device associated with the module 408 previously being examined by the user in FIGS. 5A through 5C. However the device 406 is selected, the augmented reality object 436 displays information 540 identifying the selected device 406, a status 542 of the selected device 406, and a list 544 of various characteristics of the selected device 406. The augmented reality object 436 could also display information 546 describing any errors associated with the selected device 406.

In this particular example, the information 540 includes a device name and rack number for the selected device 406, although any other or additional identifying information could be used. Also, in this particular example, the status 542 includes one of multiple icons (depending on whether the selected device 406 has any errors) and a number of errors associated with the selected device 406 (if any). However, any other suitable summary of the selected device's status could be used. Further, in this particular example, the list 544 includes various names for the device characteristics, one of multiple icons (depending on whether the characteristic has any errors), and other data associated with the characteristic like a spark line or textual data. Of course, other or additional information associated with each characteristic of the selected device 406 could be displayed. In addition, in this particular example, for each error (if any) with the selected device 406, the information 546 identifies the characteristic name, an icon indicating the characteristic has an error, the type of error, a spark line, a current characteristic value, and a description of how the error might be resolved. Again, other or additional information associated with each error with the selected device 406 could be displayed. A dashed line 548 in FIG. 5D is used to indicate that only some of the contents of the augmented reality object 436 might be displayed at any given time, and a user could use the scrollbar 506 or other mechanism to scroll through the information contained in the augmented reality object 436.

Figure 5E:
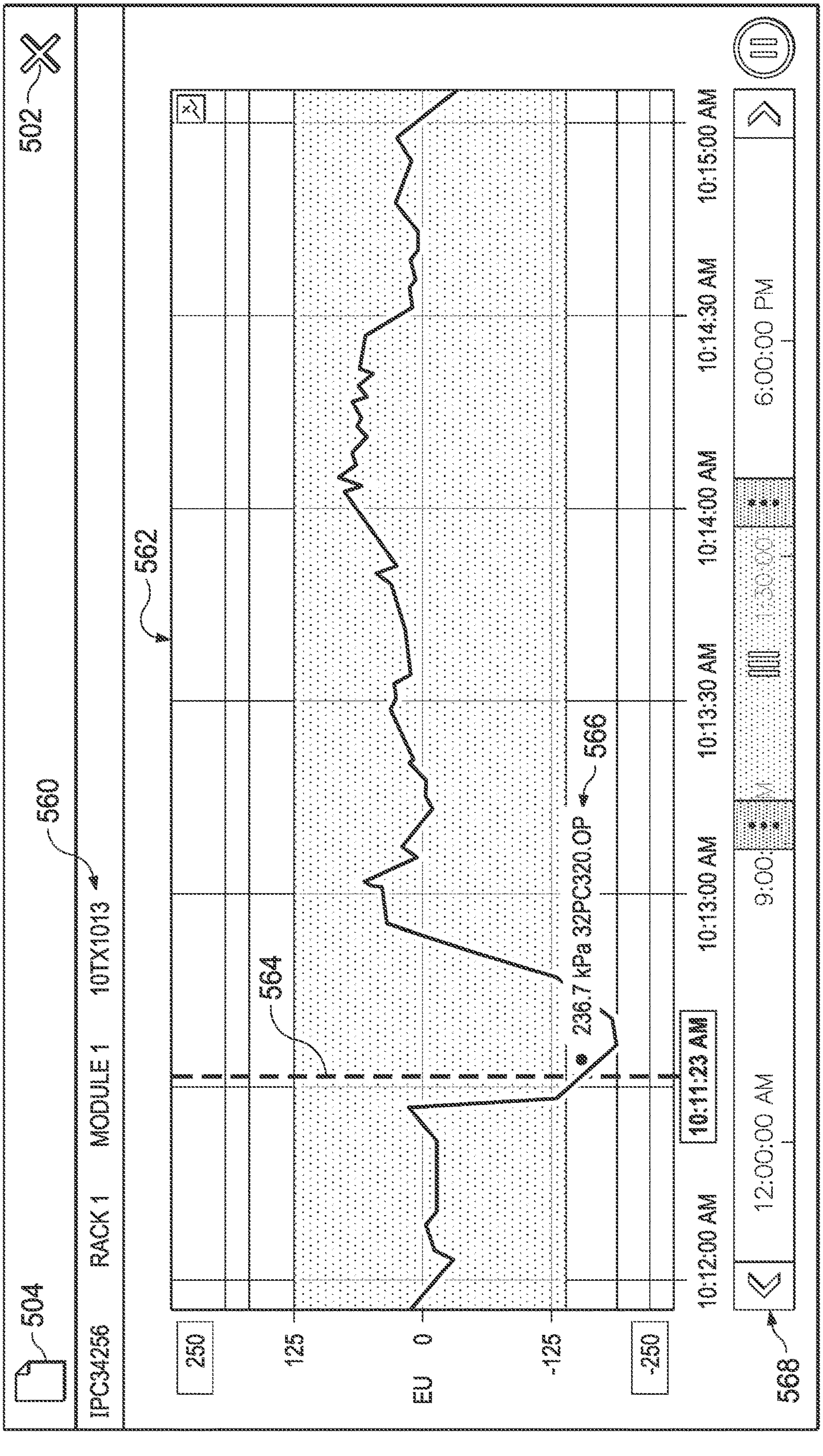

In FIG. 5E, the user has selected a specific channel, characteristic, or other variable, such as by physically selecting or dwelling on a spark line, channel, or characteristic previously displayed in the augmented reality object 436. However the specific channel, characteristic, or other variable is selected, the augmented reality object 436 displays information 560 associated with the specific variable and a trend diagram 562 for the specific variable. In this particular example, the information 560 includes a device name, rack number, module number, and variable name for the selected variable, although any other or additional identifying information could be used. Also, in this particular example, the trend diagram 562 plots the value of a variable over time and may include various markings 564 and annotations 566 that provide data to a user. Various controls 568 can be used to control the time period in which the variable's values are plotted in the trend diagram 562. Of course, the trend diagram 562 could have any other suitable form, and any suitable controls 568 (or no controls 568) could be used with the trend diagram 562.

Note that any other or additional contents could be presented to the user in the window created using the augmented reality object 436. Among other things, the contents could be based on the device or devices currently being viewed through the mobile device's camera and the user's interactions with the augmented reality object 436 or other augmented reality objects.

Although FIGS. 4A through 5E illustrate examples of augmented reality user interfaces, various changes may be made to FIGS. 4A through 5E. For example, the contents, layouts, and arrangements of the visual overlays in FIGS. 4A through 5E are for illustration only. Augmented reality visual overlays could be used to display a wide range of information. FIGS. 4A through 5E are meant to illustrate some potential uses of the visual overlays, and this disclosure is not limited to these specific augmented reality visual overlays.

FIGS. 6A through 7D illustrate example techniques for using a mobile device supporting an augmented reality user interface according to this disclosure. For ease of explanation, the techniques shown in FIGS. 6A through 7D are described as being supported by the mobile device 200 when used as a mobile device 122 in the system 100 of FIG. 1. Thus, the techniques here are used to provide information about devices in one or more industrial processes and/or one or more industrial process control and automation systems. However, the techniques described here could be used with any suitable devices and in any suitable systems (whether or not related to industrial process control and automation).

Figure 6A:
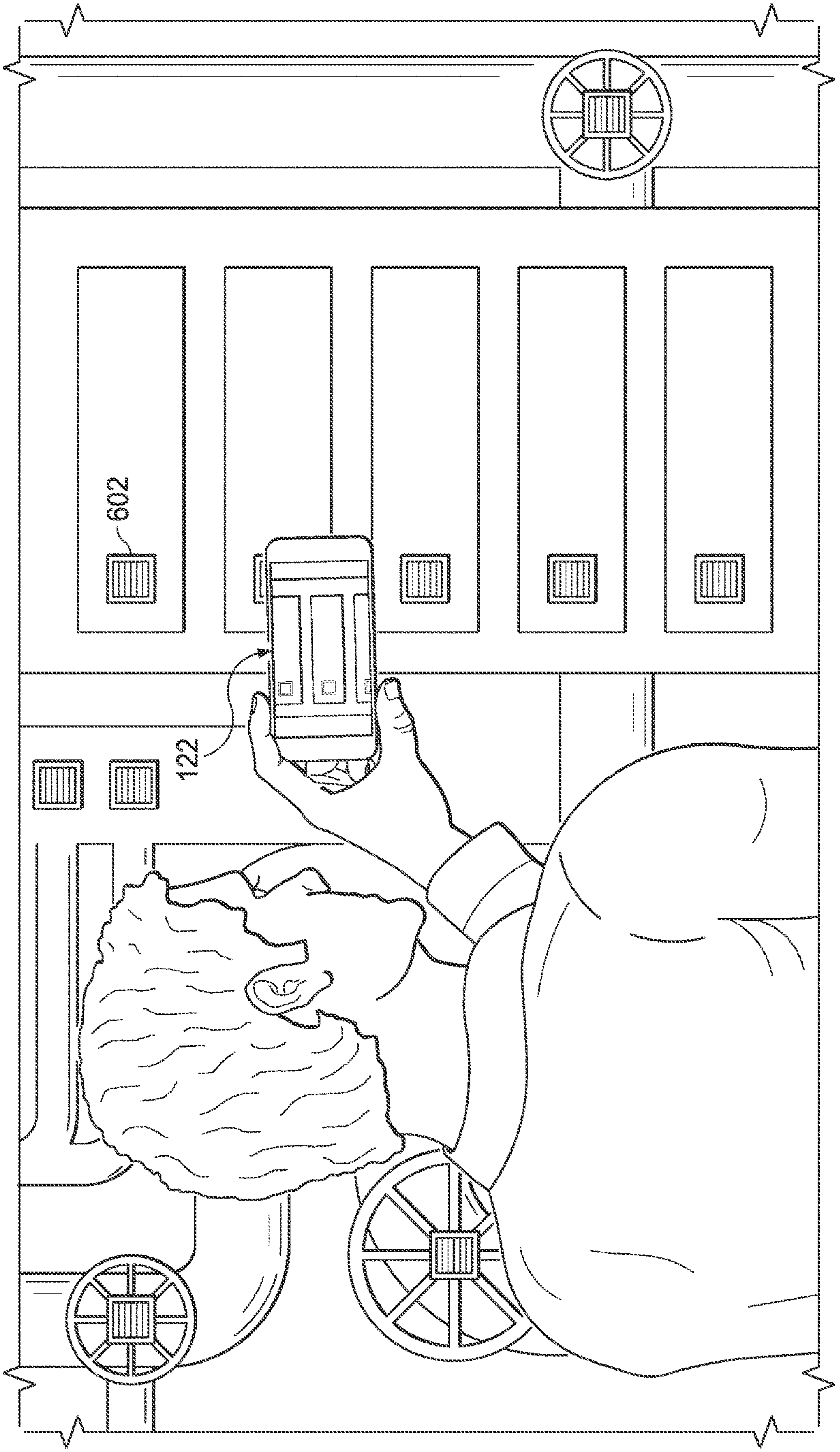
FIGS. 6A through 7D illustrate example techniques for using a mobile device supporting an augmented reality user interface according to this disclosure.
Figure 6B:
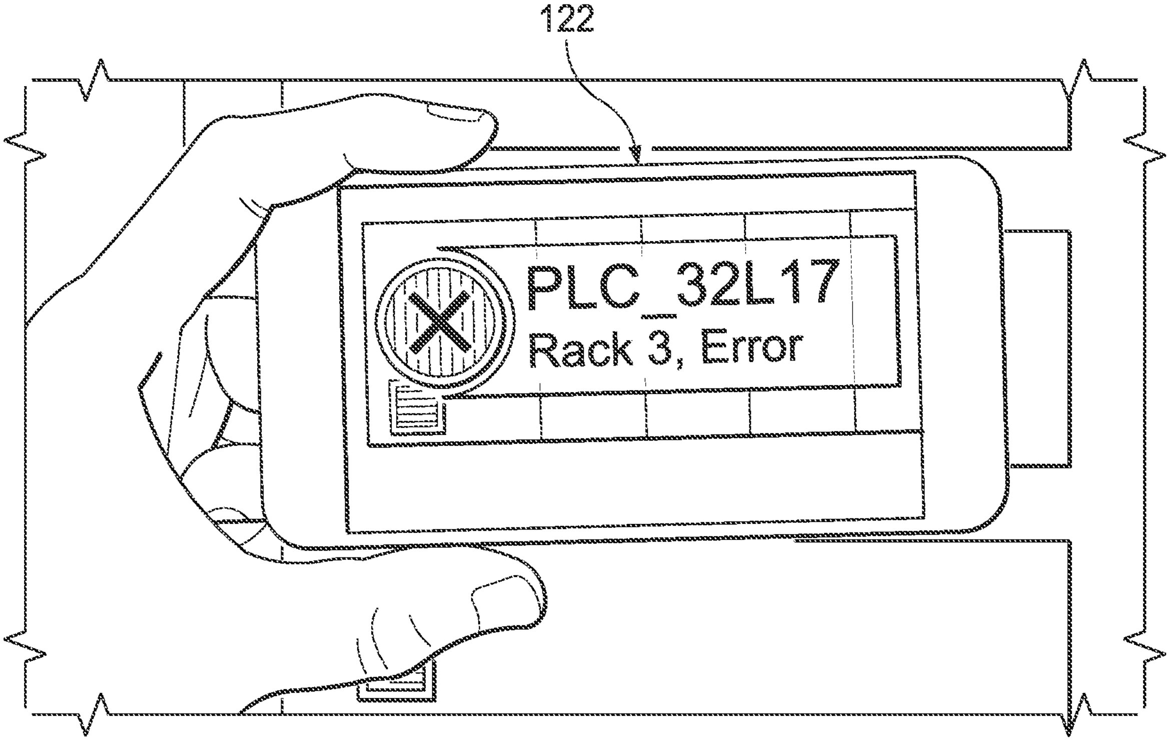
Figure 6C:
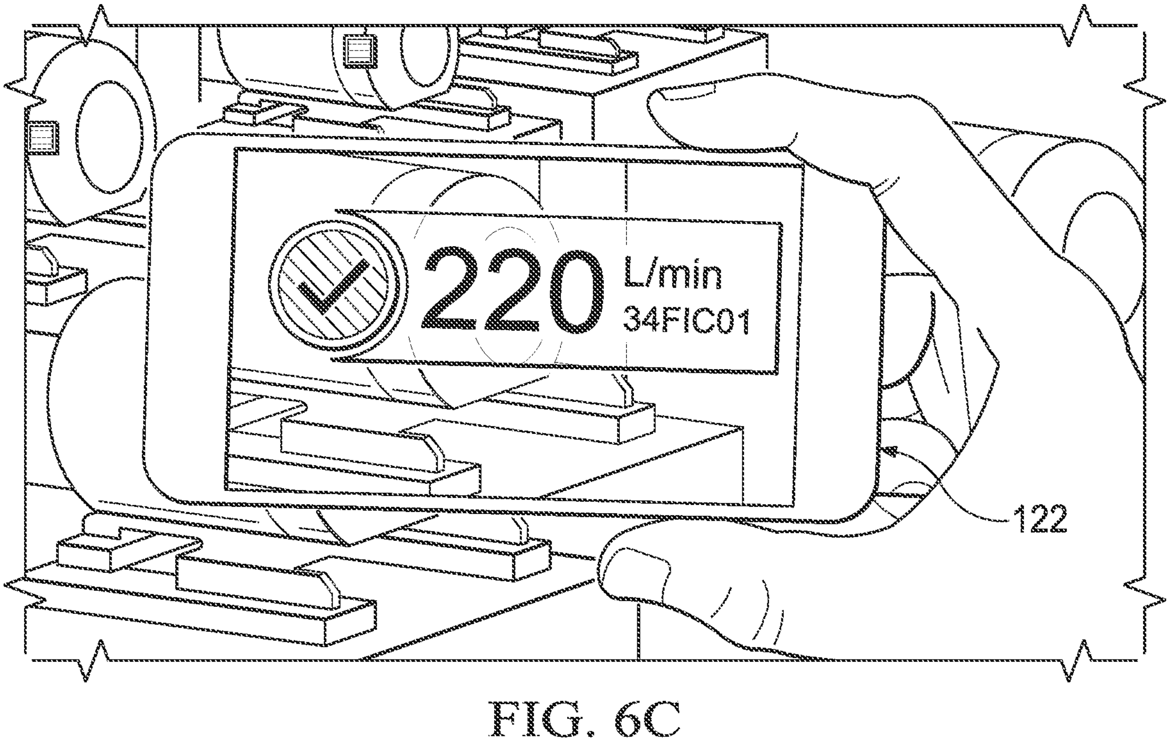

As shown in FIGS. 6A through 6C, a user is attempting to locate a specific piece of equipment or a specific module, port, or channel of a specific piece of equipment. The user can use his or her mobile device 122 to scan tags or other visual indicators 602 (such as graphical identifiers 420) on various pieces of equipment as shown in FIG. 6A, and details for different pieces of equipment can be presented on the mobile device 122 as shown in FIGS. 6B and 6C. The visual indicators 602 could denote barcodes, QR codes, or any other suitable graphical indicators.

To scan each visual indicator 602, the user could view the visual indicator 602 using the camera 216 of his or her mobile device 122, at which point the mobile device 122 can collect information using one or more images of the visual indicator 602 and identify the piece of equipment associated with the visual indicator 602. The mobile device 122 can then display to the user information about the identified piece of equipment, such as its name and its status. Other or additional information, such as location information provided by a GPS or WiFi transceiver, a wireless beacon, or other mechanism, could also be used to identify a specific piece of equipment.

Prior to reaching the area with the specific piece of equipment, the mobile device 122 could provide navigation instructions or other information to help the user reach the general area in which the specific piece of equipment is located. Once the desired piece of equipment is identified, the user could use the mobile device 122 to identify specific modules of the equipment or perform other functions. This approach can help the user to locate desired equipment more quickly, which can often be difficult. For instance, the user may be attempting to physically locate a specific hardware fault on a single I/O channel of a controller having thousands of I/O channels.

Figure 7A:
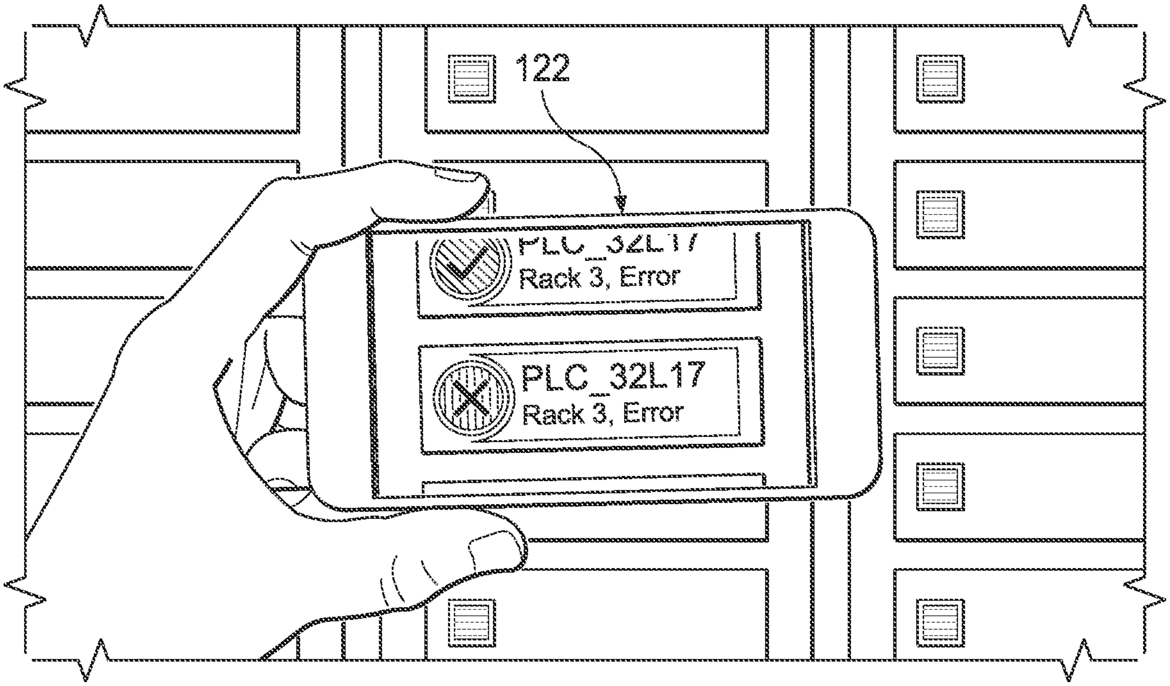
Figure 7B:
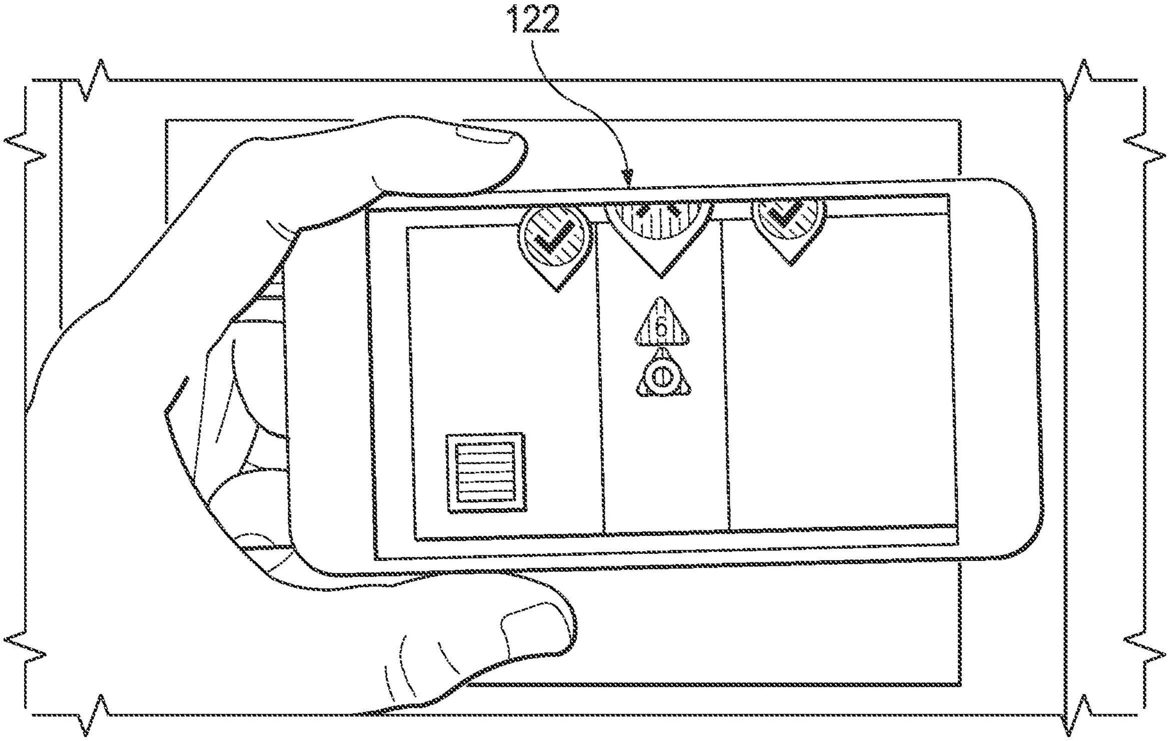
Figure 7C:
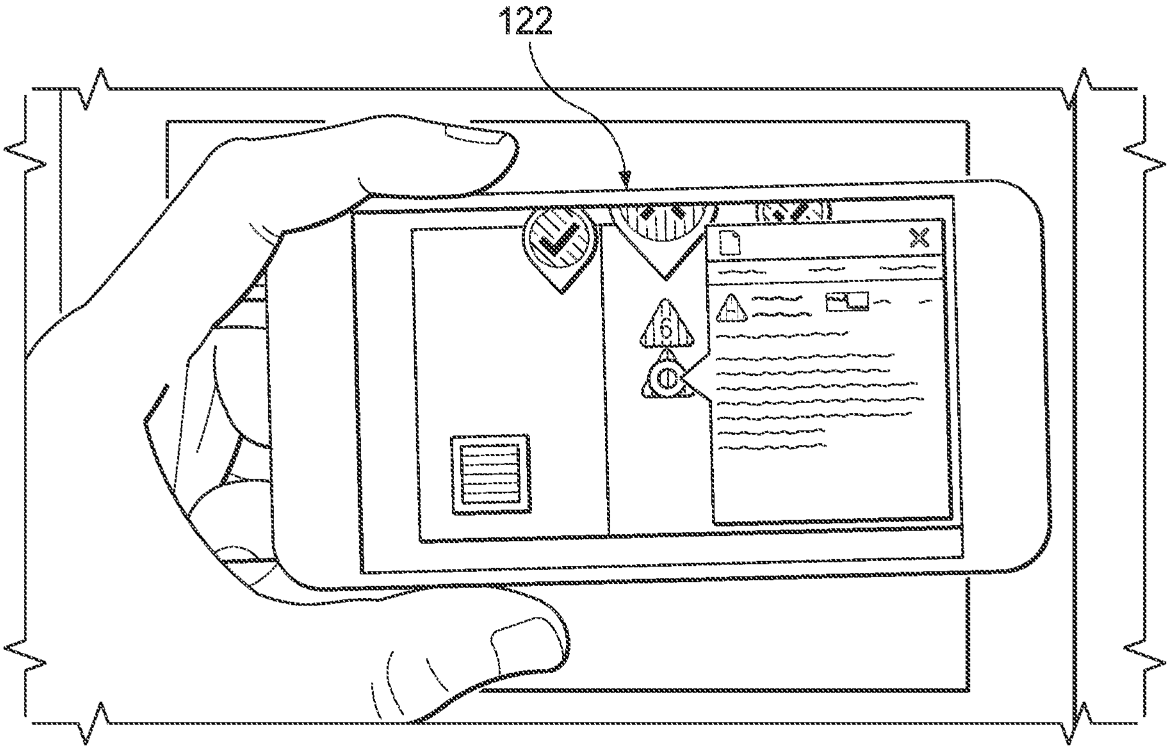
Figure 7D:
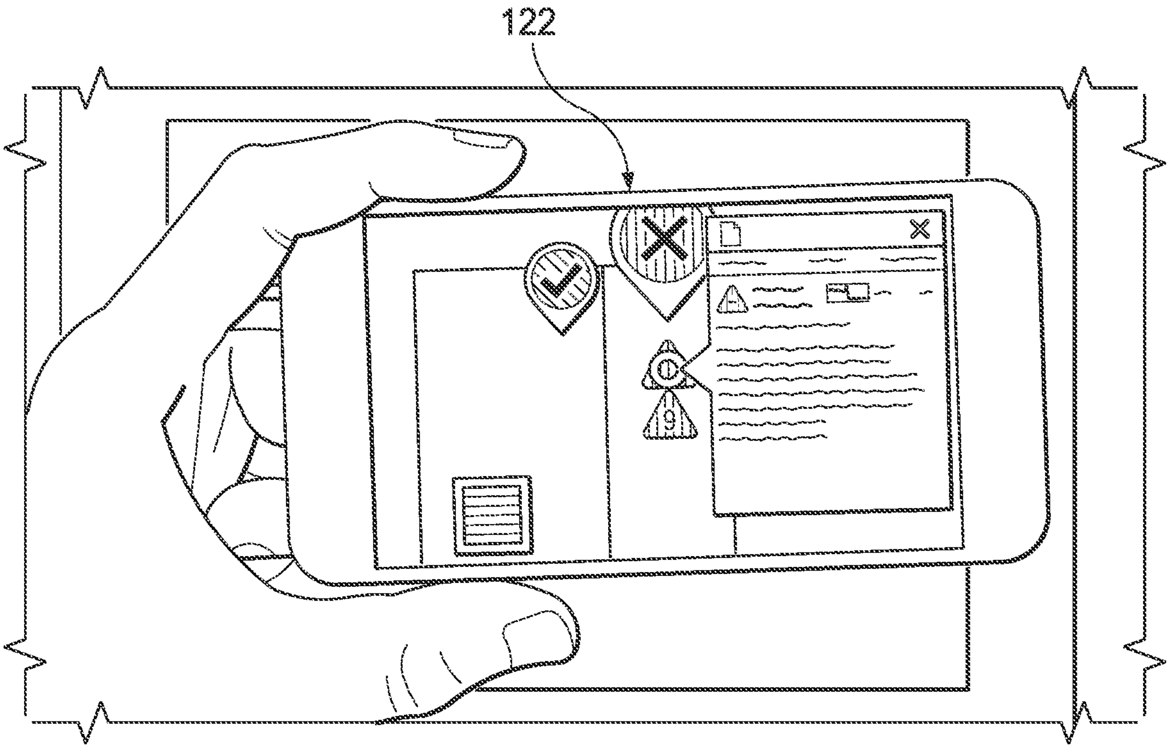

As shown in FIGS. 7A through 7D, a user is attempting to troubleshoot a problem with a specific piece of equipment (a PLC in this example). The user can use his or her mobile device 122 to identify the specific piece of equipment as shown in FIG. 7A and to obtain a list of augmented reality indicators identifying possible alarms, warnings, or other indicators for that specific piece of equipment as shown in FIG. 7B. The user could then dwell on each augmented reality indicator in order to view a window containing detailed information about that indicator as shown in FIGS. 7C and 7D. The user could use the detailed information for each alarm, warning, or other indicator to try and resolve the associated issue with the specific piece of equipment.

Among other things, this type of functionality could be used to improve the ease of locating devices. For example, a user could activate an "app" or other application on the user's mobile device 122 when the user is approaching or within a facility or other environment containing a number of devices. If the user wishes to locate a specific device and knows the general area where the specific device is located, the user could go to that general area. If the user does not know the general area where the specific device is located, the user could provide an identification of the specific device, an identification of an issue to be resolved involving the specific device, or other information to the mobile device 122, and the mobile device 122 could provide navigation instructions to reach the specific device. In any case, once in the general area of the specific device, the user could use one or more augmented reality visual overlays to identify the specific device, such as by scanning tags or other visual indicators to identify the specific device or by using a visual overlay to identify a device suffering from a specific problem.

This type of functionality could also be used to improve the performance of other functions involving devices. For example, during the installation of a specific device, the user can use the app or other application on his or her mobile device 122 to obtain information about the specific device to assist in the physical installation or configuration of the specific device or its subcomponents. As another example, the user can use the app or other application on his or her mobile device 122 to obtain information about a specific device or about one or more other devices connected to or interacting with that specific device. The user could drill down as needed to identify any problems being experienced and possible solutions to those problems. If a specific module or other subcomponent of a device is identified as the cause of a problem or otherwise needs to be located, the user can use his or her mobile device 122 to locate that subcomponent. If the user needs to configure or reconfigure a device or any of its subcomponents, the user could do so using his or her mobile device 122.

As can be seen here, this type of functionality can greatly increase the ease of performing various tasks in complex systems having large numbers of devices. While specific examples of these tasks are provided above, these are for illustration only, and any number of additional tasks could be supported or performed using this type of functionality.

Moreover, while this type of functionality is often described as being used with industrial processes and industrial process control and automation systems, this type of functionality could find use in a number of other areas. For example, building management solutions are often used to control the equipment used within office buildings or other large structures. As a particular example, automation controllers in an automation system can use operational, diagnostics, or other data to control equipment such as heating, ventilation, and air conditioning (HVAC) equipment and variable air volume (VAV) control equipment in a building or other structure. Operational data that could be used by the building automation controllers may include temperatures in different rooms or other areas of the structure. The same type of approach described above could be used to allow users' mobile devices 122 to present augmented reality visual overlays associated with devices in the automation system or the underlying control equipment. The visual overlays could be used to assist in functions such as the installation of, navigation to, or maintenance of these devices. As a particular example, the visual overlays could incorporate the display of labels and current values for variables associated with equipment and other operational information. A user's mobile device 122 could provide navigation instructions to reach specific devices, allow the scanning of tags or other visual indicators, provide progressive information about devices, or perform any other functions described above.

In addition, note that certain functions are described above as being based on distance, such as when progressively more information is provided to a user as the user moves closer to one or more devices. However, changes in actual physical distance may not be required to invoke those functions. For example, a user might not be able to approach one or more devices easily, such as due to physical obstacles. In these or other cases, a user could use the "zoom" feature on his or her mobile device's camera to move closer virtually to the one or more devices. Depending on the resolution and zoom abilities of the mobile device's camera, the user may be able to scan tags or other visual indicators or give the appearance that the user is physically approaching the devices. The contents of an augmented reality visual overlay can therefore vary based on a "perceived" distance or proximity to one or more devices, where the perceived distance or proximity is based on the one or more devices' size(s) or other features within one or more images. The perceived distance or proximity can be based on the actual physical distance(s) to the one or more devices or the zoomed-in size(s) of the one or more devices.

Although FIGS. 6A through 7D illustrate examples of techniques for using a mobile device supporting an augmented reality user interface, various changes may be made to FIGS. 6A through 7D. For example, augmented reality user interfaces could be used in a number of ways with devices in a system. FIGS. 6A through 7D are meant to illustrate potential techniques for using visual overlays to assist users in performing certain functions, and this disclosure is not limited to these particular uses.

Figure 8:
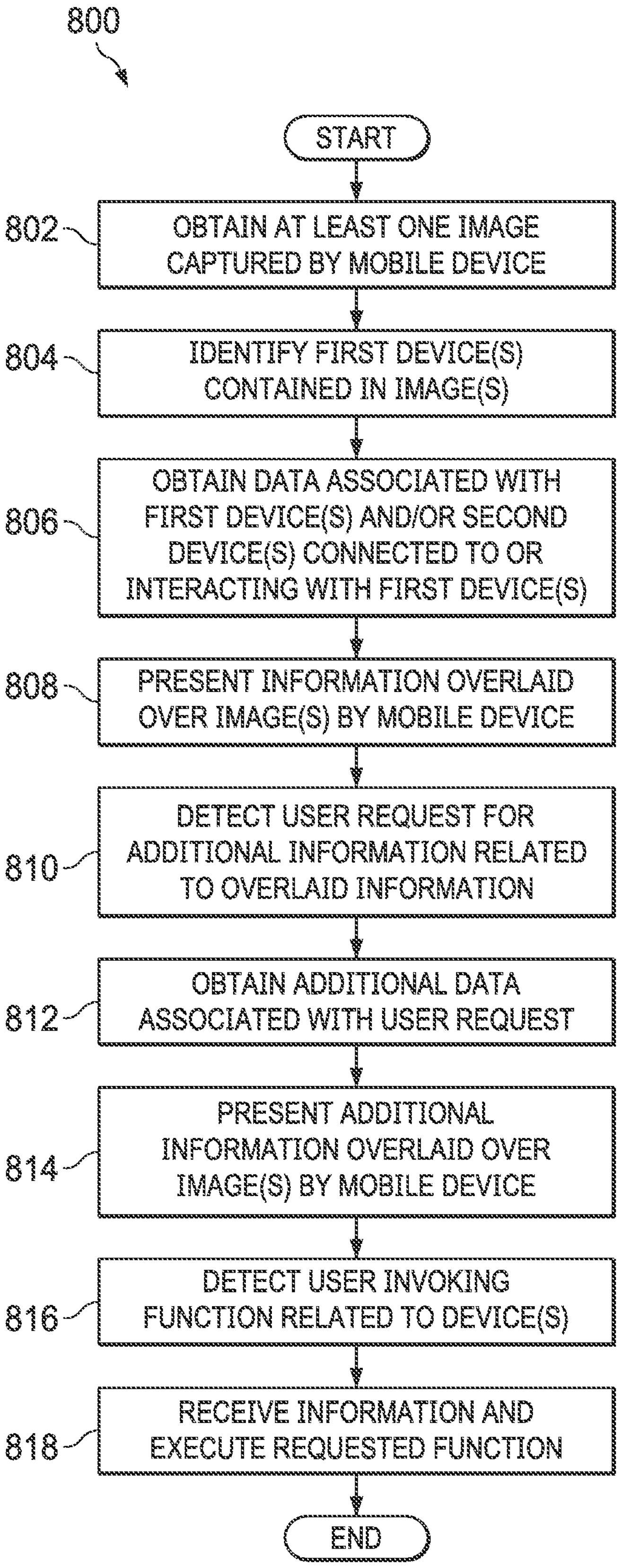
FIG. 8 illustrates an example method for presenting information related to an industrial process, control and automation system, or other system using an augmented reality user interface according to this disclosure.

FIG. 8 illustrates an example method 800 for presenting information related to an industrial process, control and automation system, or other system using an augmented reality user interface according to this disclosure. For ease of explanation, the method 800 is described as involving the use of the mobile device 200 in the system 100 of FIG. 1. However, the method 800 could be used with any suitable device and in any suitable system (whether or not related to industrial process control and automation).

As shown in FIG. 8, at least one image captured by a mobile device is obtained at step 802. This could include, for example, the processor 214 of the mobile device 200 receiving image data from the camera 216 and processing the image data to generate an image or a stream of images. At least one first device contained in the one or more images is identified at step 804. This could include, for example, the processor 214 of the mobile device 200 using its image processing features to detect one or more barcodes, QR codes, or other graphical identifiers 420 contained in the captured image(s). Any other or additional features could be used to identify the first device(s) in the image(s), such as special-purpose markers or natural features of the device(s).

Data associated with the at least one first device or at least one second device connected to or interacting with the first device(s) is obtained at step 806. This could include, for example, the processor 214 of the mobile device 200 receiving data directly from the first or second device(s) or receiving the data indirectly from the device(s) via another component, such as a historian 114, server 116, computing cloud 118, or remote server. Information is presented to a user of the mobile device at step 808. This could include, for example, the processor 214 of the mobile device 200 using its image processing features to insert one or more augmented reality objects over the previously-captured image(s) or newly-captured image(s). The presented information can vary based on perceived distance or proximity of the mobile device to the one or more first devices. The information could include at least some of the data obtained in step 806 or information that is based on that data.

The augmented reality object or objects that are presented to the user in step 808 could vary based on a number of factors. For example, as noted above, perceived distance or proximity can be based on actual distance or proximity or based on a device's size or other features within the image(s). In some embodiments, the augmented reality objects that are presented to the user could include names and statuses of multiple pieces of equipment when the mobile device 200 is farther away from the pieces of equipment. The augmented reality objects that are presented to the user could also include statuses of individual modules in at least one of the pieces of equipment when the mobile device 200 is closer to the pieces of equipment. The augmented reality objects could further include one or more objects identifying issues affecting at least one of the pieces of equipment or a window containing data associated with at least one of the modules in at least one of the pieces of equipment. As noted above, different types of information can be presented to the user using the augmented reality objects, and that information can vary as needed or desired.

Various operations can also occur depending on what the user chooses to do next. For instance, a user request for additional information related to the overlaid information could be detected at step 810. This could include, for example, the processor 214 of the mobile device 200 detecting the user dwelling on an augmented reality object that was previously overlaid by the mobile device 200. This could also include the user physically touching an augmented reality object that was previously overlaid by the mobile device 200. Additional information associated with the user request is obtained at step 812 and presented in an overlaid manner at step 814. This could include, for example, the processor 214 of the mobile device 200 requesting additional information related to the augmented reality object that the user dwelled upon, and the additional information could be obtained from any suitable source or sources (including the mobile device 200 itself).

As another example, a user request to invoke a function related to one or more devices could be detected at step 816. This could include, for example, the processor 214 of the mobile device 200 detecting that the user has selected a function in a toolkit 430 displayed to the user. Any other or additional mechanism can also be used to allow a user to invoke one or more functions related to the first and second devices. Information associated with the requested function is received and the function is executed at step 818. This could include, for example, the processor 214 of the mobile device 200 performing functions to allow the user to send commands to one or more devices, to reconfigure one or more devices, or perform other functions related to one or more devices.

Although FIG. 8 illustrates one example of a method 800 for presenting information related to an industrial process, control and automation system, or other system using an augmented reality user interface, various changes may be made to FIG. 8. For example, while shown as a series of steps, various steps in FIG. 8 could overlap, occur in parallel, occur in a different order, or occur any number of times. Also, as described above, there are a number of ways in which an augmented reality user interface could be used with devices of a system, and the examples described above with respect to FIG. 8 do not limit this disclosure to those example uses.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for presenting information relating to an industrial process of a control and automation system on a mobile device using an augmented reality user interface comprising:

identifying one or more first devices contained in at least one image captured by the mobile device;

obtaining data associated with at least one of: the one or more first devices and one or more second devices connected to or interacting with the one or more first devices; and presenting information comprising different augmented reality objects overlaid over the at least one image by the mobile device to a user, the presented information comprising the data or information based on the data;

wherein the presented information includes various levels of information that varies based on perceived distance or proximity of the mobile device to the one or more first devices which is based on at least one of actual distance, proximity, or a size of the one or more first devices within the at least one image, and wherein the augmented reality objects comprise:

a name and a status of multiple pieces of equipment of the control and automation system overlaid over the at least one image when the mobile device is farther away from the one or more first devices; and statuses of individual modules in at least one of the pieces of equipment of the control and automation system overlaid over the at least one image when the mobile device is closer to the one or more first devices.

2. The method of claim 1, wherein identifying the one or more first devices comprises at least one of:

detecting the user dwelling on a visual identifier associated with at least one of the one or more first devices and identifying the at least one of the one or more first devices using the visual identifier; and detecting the user dwelling on the at least one of the one or more first devices.

3. The method of claim 1, wherein obtaining the data comprises at least one of:

receiving the data directly from at least one of the one or more first devices and the one or more second devices; and receiving the data indirectly from at least one of the one or more first devices and the one or more second devices via another component.

4. The method of claim 1, wherein presenting the information comprises:

presenting different augmented reality objects over the at least one image based on the perceived distance or proximity of the mobile device to the one or more first devices.

5. The method of claim 1, wherein the augmented reality objects further comprise at least one of:

one or more issues affecting at least one of the pieces of equipment overlaid over the at least one image; and a window containing data associated with at least one of the modules in at least one of the pieces of equipment overlaid over the at least one image.

6. The method of claim 1, wherein presenting the information comprises:

presenting at least some of the information in a window; and allowing the user to navigate within the window and to select additional information for display in the window.

7. The method of claim 1, wherein obtaining the data comprises:

detecting the user dwelling on an augmented reality object overlaid over the at least one image; and obtaining information associated with the augmented reality object.

8. A mobile device for presenting information relating to an industrial process of a control and automation system on the mobile device using an augmented reality user interface comprising:

a display;

a camera configured to capture at least one image of one or more first devices; and at least one processor configured to:

identify the one or more first devices contained in the at least one image;

obtain data associated with at least one of: the one or more first devices and one or more second devices connected to or interacting with the one or more first devices; and present information comprising different augmented reality objects overlaid over the at least one image on the display to a user, the presented information comprising the data or information based on the data;

wherein the presented information includes various levels of information that varies based on perceived distance or proximity of the mobile device to the one or more first devices which is based on at least one of actual distance, proximity, or a size of the one or more first devices within the at least one image, and wherein the augmented reality objects comprise:

a name and a status of multiple pieces of equipment of the control and automation system overlaid over the at least one image when the mobile device is farther away from the one or more first devices; and statuses of individual modules in at least one of the pieces of equipment of the control and automation system overlaid over the at least one image when the mobile device is closer to the one or more first devices.

9. The mobile device of claim 8, wherein, to identify the one or more first devices, the at least one processor is configured to:

detect the user dwelling on a visual identifier associated with at least one of the one or more first devices and identify the at least one of the one or more first devices using the visual identifier; and detect the user dwelling on the at least one of the one or more first devices.

10. The mobile device of claim 8, wherein, to present the information, the at least one processor is configured to present different augmented reality objects over the at least one image based on the perceived distance or proximity of the mobile device to the one or more first devices.

11. The mobile device of claim 8, wherein the augmented reality objects further comprise at least one of:

one or more issues affecting at least one of the pieces of equipment overlaid over the at least one image; and a window containing data associated with at least one of the modules in at least one of the pieces of equipment overlaid over the at least one image.

12. The mobile device of claim 8, wherein, to present the information, the at least one processor is configured to:

present at least some of the information in a window; and allow the user to navigate within the window and to select additional information for display in the window.

13. The mobile device of claim 8, wherein, to obtain the data, the at least one processor is configured to:

detect the user dwelling on an augmented reality object overlaid over the at least one image; and obtain information associated with the augmented reality object.

14. A non-transitory computer readable medium containing instructions that when executed cause at least one processing device, for presenting information relating to an industrial process of a control and automation system on a mobile device using an augmented reality user interface, to:

identify one or more first devices contained in at least one image captured by a mobile device;

obtain data associated with at least one of: the one or more first devices and one or more second devices connected to or interacting with the one or more first devices; and present information comprising different augmented reality objects overlaid over the at least one image by the mobile device to a user, the presented information comprising the data or information based on the data;

wherein the presented information includes various levels of information that varies based on perceived distance or proximity of the mobile device to the one or more first devices which is based on at least one of actual distance, proximity, or a size of the one or more first devices within the at least one image, and wherein the augmented reality objects comprise:

a name and a status of multiple pieces of equipment of the control and automation system overlaid over the at least one image when the mobile device is farther away from the one or more first devices; and statuses of individual modules in at least one of the pieces of equipment of the control and automation system overlaid over the at least one image when the mobile device is closer to the one or more first devices.

15. The non-transitory computer readable medium of claim 14, wherein the instructions that when executed cause the at least one processing device to identify the one or more first devices comprise:

instructions that when executed cause the at least one processing device to:

detect the user dwelling on a visual identifier associated with at least one of the one or more first devices and identify the at least one of the one or more first devices using the visual identifier; and detect the user dwelling on the at least one of the one or more first devices.

16. The non-transitory computer readable medium of claim 14, wherein the instructions that when executed cause the at least one processing device to present the information comprise:

instructions that when executed cause the at least one processing device to present different augmented reality objects over the at least one image based on the perceived distance or proximity of the mobile device to the one or more first devices.

17. The non-transitory computer readable medium of claim 14, wherein the augmented reality objects comprise at least one of:

one or more issues affecting at least one of the pieces of equipment overlaid over the at least one image; and a window containing data associated with at least one of the modules in at least one of the pieces of equipment overlaid over the at least one image.

18. The non-transitory computer readable medium of claim 14, wherein the instructions that when executed cause the at least one processing device to present the information comprise:

instructions that when executed cause the at least one processing device to:

present at least some of the information in a window; and allow the user to navigate within the window and to select additional information for display in the window.

* * * * *